C. HART.
Improvement in Butchers' Cleavers.
No. 131,754.  Patented Oct. 1, 1872.
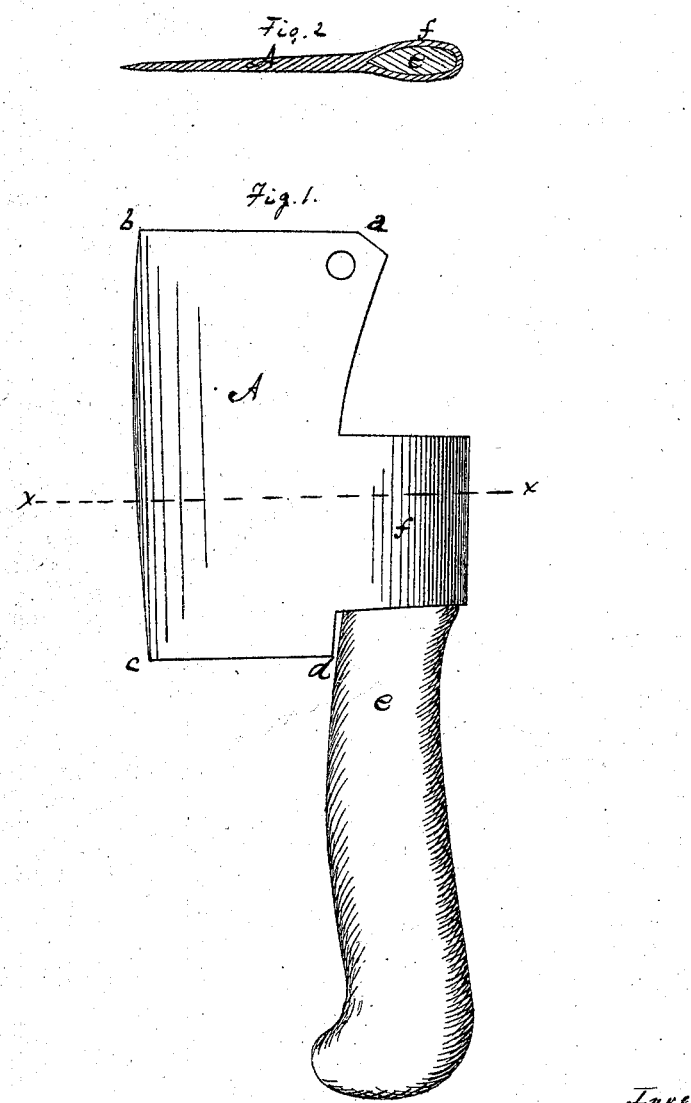

UNITED STATES PATENT OFFICE.

CHAUNCEY HART, OF UNIONVILLE, CONNECTICUT.

IMPROVEMENT IN BUTCHERS' CLEAVERS.

Specification forming part of Letters Patent No. 131,754, dated October 1, 1872.

*To all whom it may concern:*

Be it known that I, CHAUNCEY HART, of Unionville, in the county of Hartford and State of Connecticut, have invented a new and useful Construction for Butchers' Cleavers, of which the following is a specification, reference being had to the accompanying drawing, in which—

Figure 1 is a broad-side view of the cleaver and its handle, and Fig. 2 is a cross-section through the line $x\ x$.

The general outline of the cleaver A, indicated by the letters $a\ b\ c\ d$ is the same as usual, but the part serving for purpose of attaching it to the handle is different. Heretofore a tang starting from the corner $d$, and extending in the direction of the handle $e$, has been made upon the cleaver, and upon this tang a handle has been driven, the same as a handle is driven upon the tang of a file. A cleaver is used to deal heavy blows, and such blows soon destroy handles driven upon such tangs, so that butchers have been compelled to keep a hatchet as well as a cleaver to be used in severing bones. In place of this tang I make an eye, $f$, upon the cleaver, and into this fasten the handle $e$, so that I make an attachment for the handle capable of sustaining long and hard usage, and enabling the butcher to dispense with his auxiliary hatchet.

I claim as my invention—

As a new article of manufacture, the cleaver-body A having the eye $f$ upon its upper edge, substantially as described, and for the purpose set forth.

CHAUNCEY HART.

Witnesses:
  C. L. MASON,
  JOSEPH W. CURTIS.